March 28, 1939.   J. W. STEVENS   2,151,944
AGITATOR
Filed March 14, 1936   2 Sheets-Sheet 1
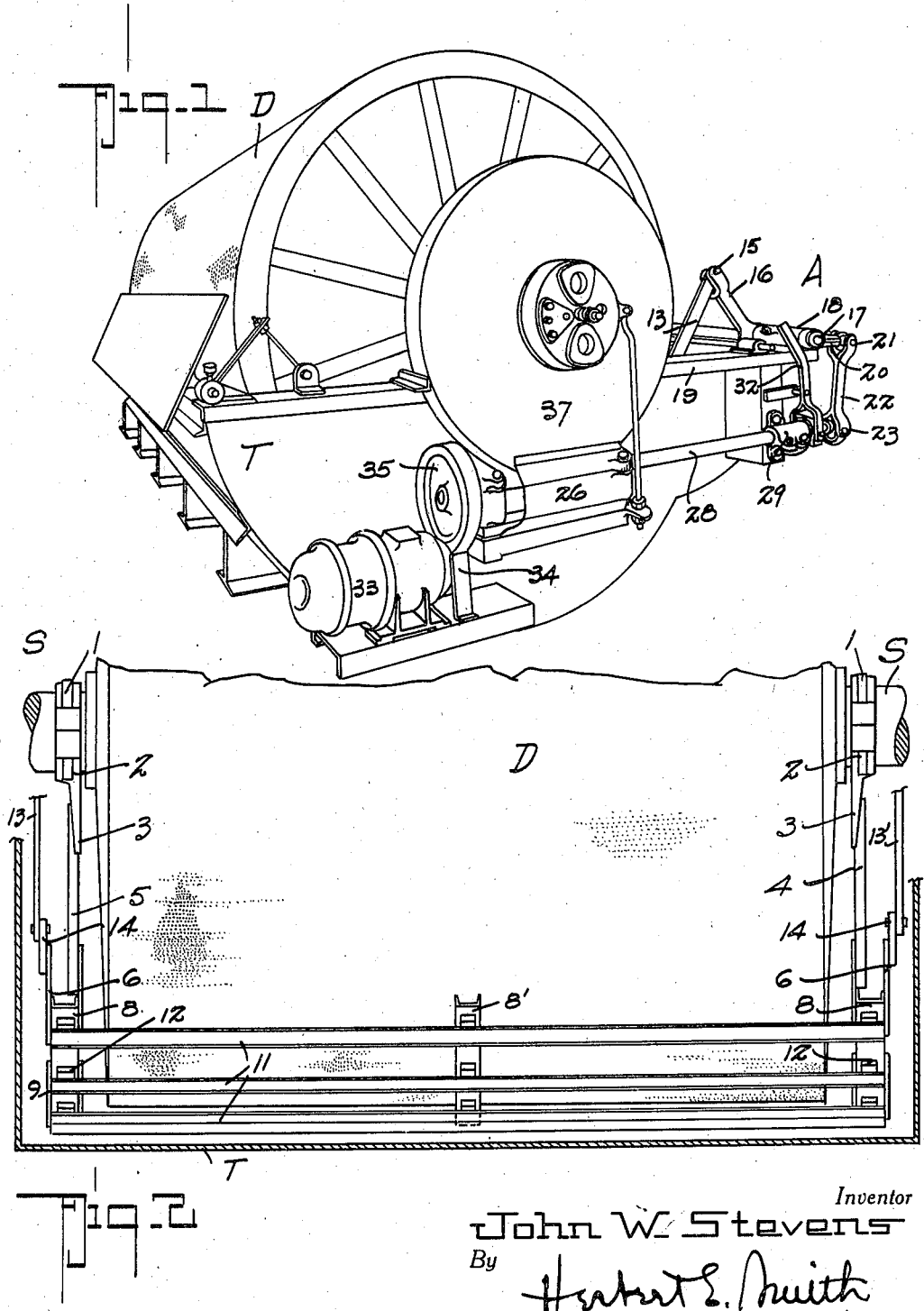
Inventor
John W. Stevens
By Herbert E. Smith
Attorney

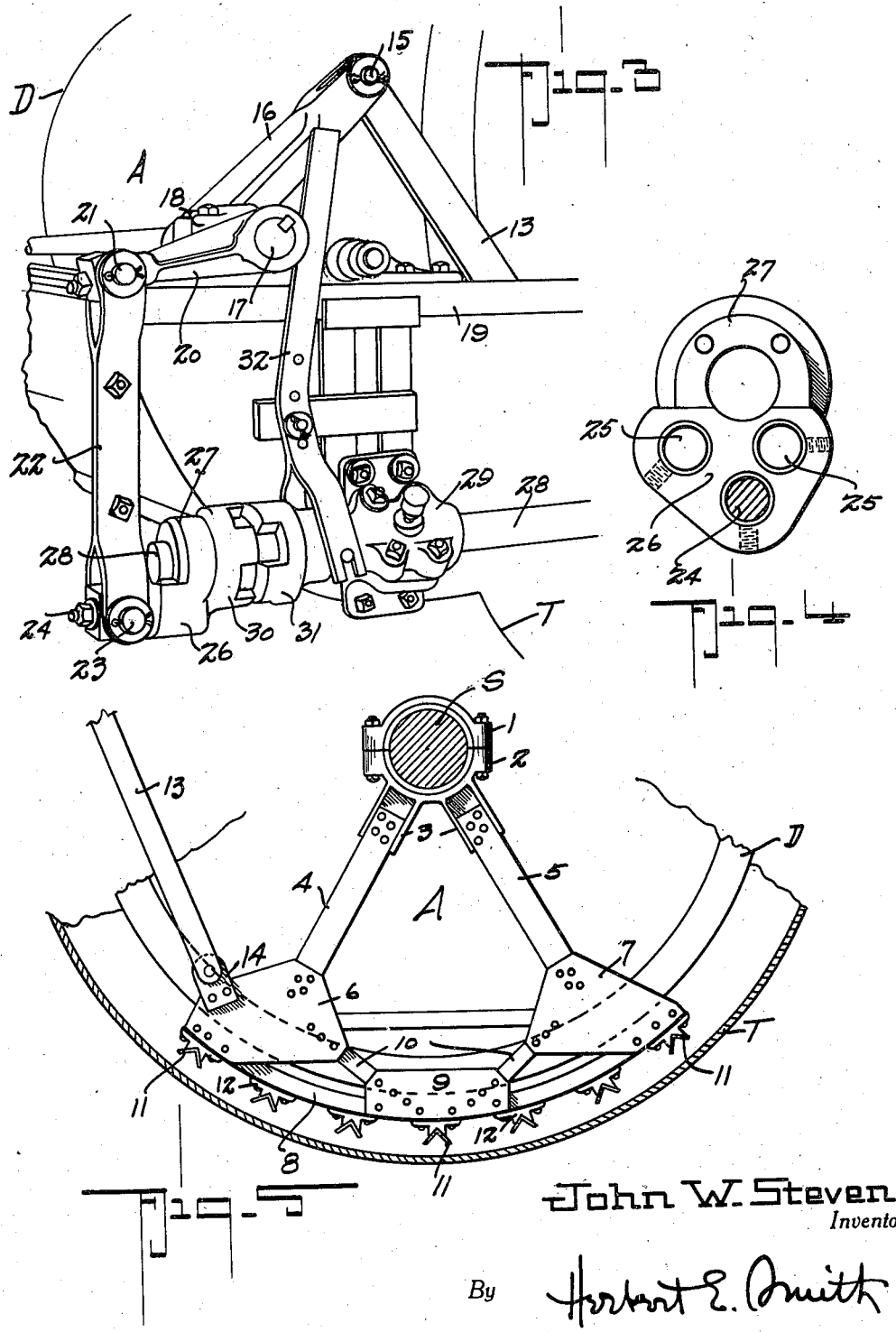

Patented Mar. 28, 1939

2,151,944

UNITED STATES PATENT OFFICE 2,151,944

AGITATOR

John W. Stevens, Salt Lake City, Utah, assignor to Eimco Corporation, Salt Lake City, Utah Application March 14, 1936, Serial No. 68,899

1 Claim. (Cl. 210—199)

The present invention relates to improvements in agitators adapted especially for use in vacuum filters of the rotary drum and disk type that are employed in the filtration of slimes in the cyanide process of handling gold and silver ores, and in other fields of operation for dewatering, washing, and reclaiming materials.

The agitator of my invention is located and operates in the filter tank beneath the filter drum, and the agitator is suspended from or journaled on the rotary drum shaft, exterior of the drum, so that the agitator may oscillate beneath the drum and transversely of the drum and the tank. The oscillating agitator by its movement at the bottom of the tank, prevents heavy particles of material from settling in the tank bottom, and by its continuous operation the agitator maintains a homogeneous mixture of material in the filter tank for treatment by the drum.

In carrying out my invention, the parts of the agitator are all compactly arranged, and the mechanism is operated from the driving mechanism of the rotary drum, means being provided whereby the driving mechanism for the agitator may readily be disconnected from the main driving mechanism of the filter when desirable or necessary. Means are also provided for adjusting the speed of the agitator and for varying the stroke of the oscillating agitator, and by the utilization of compactly arranged transmission mechanism, the rotary movement of the drum-driving mechanism is translated into the oscillating mechanism of the agitator.

The invention consists in certain novel combinations and arrangements of parts as will hereinafter be more fully set forth and claimed. In the accompanying drawings I have illustrated one complete example of the physical embodiment of my invention, wherein the parts are combined and arranged according to one mode I have thus far devised for the practical application of the principles of my invention.

Figure 1 is a perspective view of a vacuum filter of the rotary drum and disk type with which the agitator of my invention is equipped.

Figure 2 is a longitudinal sectional view showing the bottom of the filter tank, and showing the agitator journaled on the drum-shaft.

Figure 3 is a perspective view at one end of the filtering apparatus, showing the clutch and transmission mechanism from the main driving shaft to the agitator.

Figure 4 is a detail of the crank device whereby the speed and stroke of the oscillating agitator may be varied or adjusted.

Figure 5 is a sectional detail view through the bottom of the filter tank, showing a portion of the drum, with the drum-shaft in section, and showing one end of the agitator In order that the general arrangement and utility of parts may readily be understood I have indicated in Figure 1 the rotary drum D, with its shaft S, the drum being supported to rotate with its lower portion in the tank T, which as shown is semi-circular in cross section.

The agitator, which is indicated as a whole by the letter A, is provided with a pair of spaced spider-heads of arcuate shape, suspended from the shaft S exterior of the ends or heads of the drum, and the working parts of the agitator operate in the bottom portion of the tank, beneath the rotating drum.

For suspending the agitator from the shaft S, I employ a sectional-bearing at each end of the agitator, each of which journal bearings comprises the journal members 1 and 2 mounted on the shaft, the lower section 2 being provided with attaching arms 3, 3, by means of which the diverging legs 4 and 5 are supported from the bearing. The legs are riveted or bolted to the bracket arms, and at the divergent ends of these legs are attached frame plate 6 and 7, which are rigidly connected by three cross bars, as 8, 8, at the ends of the agitator and 8' located at the approximate center of the agitator. These cross bars, which are of arcuate shape having the axis of the shaft S as a center, are preferably fashioned of channel strips bent to the proper shape, and they are rigidly riveted or bolted to the frame plates, except for cross bar 8'. Each spider-head also includes an intermediate frame-plate 9 which is bolted or riveted at the center of a cross bar 8, and diagonal braces 10, 10 connect the intermediate plates with the outer plates 8, 8.

A suitable number of agitating bars 11, arranged in parallelism, spaced equidistant, and extending longitudinally of the drum and tank are mounted on the two spaced heads, to oscillate through and in the material contained in the bottom of the tank. These agitating or stirring bars, which are preferably fashioned of angle strips or angle bars, are attached to the outer sides of the cross bars 8 and 8' by means of saddles 12 fixed to the cross bars and provided with V-shaped seats for the reception of the agitator bars. As thus constructed, the agitator, as a whole, provides a rigid oscillating frame of required weight for the purpose, and the stirrer or agitator bars 11, oscillating or reciprocating back and forth through the material in the bottom of the tank, serve to prevent settling of the material, and also serve to maintain the material in proper condition for efficient operation of the filter drum.

At each end of the agitator a pitman as 13, 13' is connected at 14 with a frame plate 6 of a head, and this pitman 13 indicated in Figure 1 extends diagonally or outwardly and upwardly through the open top of the tank, with its upper end pivoted at 15 to the outer end of an oscillating arm 16 rigid with an oscillating shaft 17 journaled in bearings 18 on a suitable frame portion 19 of the drum. This oscillating shaft extends the full length of the agitator, exterior of the tank, and it is connected, as described, with both heads of the agitator.

The oscillatible shaft is operated through the instrumentality of a lever 20 fixed at one end to the shaft, and the free end of this lever is provided with a universal joint 21 connecting the lever with a link 22. At the lower end of the link a second universal joint 23 is arranged, which joint includes a pin 24 adapted to seat in one of several sockets 25 in a crank arm 26 of the head 27 which is mounted loosely on the operating shaft 28. This operating shaft, which extends transversely of the tank and exterior of one end thereof imparts a rotary movement to the crank 26—27, and the rotary movement of the crank is translated into oscillating movement of the lever 20 through the intermediate link and its two universal joints 21 and 23, and then the oscillating movement is transmitted to the agitator as described.

To vary the speed of the oscillations of the agitator, and also for the purpose of varying the length of the strokes of the agitator, the several sockets 25 are arranged in different positions with relation to the shaft 28, and the pin 24 of the universal joint 23 may be seated in a selected socket and fastened therein rigidly, as by a set screw or bolt, as will be understood.

The operating shaft 28, which is journaled in bearings 29 located in suitable positions on the tank or frame of the apparatus, and a clutch device is employed thereon which includes a clutch member 30 integral with, or rigid with the crank head 27, and a slidable clutch member 31 mounted on and rotatable with the operating shaft 28. By shifting the lever 32 the clutch members may be engaged to operate the agitator, and of course the clutch lever is shifted in the opposite direction to disengage the clutch and stop the agitator.

The operating shaft 28 is driven from an electric reduction motor 33 through gearing indicated at 34 and 35, and the drum is also revolved through gearing, from the operating shaft, indicated at 36 and 37.

Having thus fully described my invention, what I claim as new and desire to secure by Letters Patent is:—

In an agitator for a vacuum filter, the combination with a rotary cylindrical drum and its shaft, and a semi-cylindrical tank spaced from and enclosing the lower portion of the drum, of a pair of spider-heads journaled on the shaft exterior of the drum, arcuate cross-bars rigid with the spider-heads and located in the space between the drum and tank, a series of spaced, longitudinally extending agitator-bars rigid with the cross bars, said agitator bars comprising strips having at least two faces forming an angle of substantially ninety degrees with each other, said strips being so positioned that the apex of the angle between them is directed toward the axis of the shaft and so that the said angle is substantially bisected by a plane passing through the axis of the shaft, means for oscillating the agitator, and means operated from the drum shaft for actuating the oscillating means.

JOHN W. STEVENS.